United States Patent
Setia et al.

(10) Patent No.: US 9,125,130 B2
(45) Date of Patent: Sep. 1, 2015

(54) BLACKLISTING BASED ON A TRAFFIC RULE VIOLATION

(75) Inventors: Deepinder Setia, San Ramon, CA (US); Pradeep Iyer, Cupertino, CA (US); John Taylor, Tiburon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1188 days.

(21) Appl. No.: 11/527,171

(22) Filed: Sep. 25, 2006

(65) Prior Publication Data
US 2008/0126531 A1    May 29, 2008

(51) Int. Cl.
 *G06F 21/62*  (2013.01)
 *H04W 48/02*  (2009.01)
(52) U.S. Cl.
 CPC .................................. *H04W 48/02* (2013.01)
(58) Field of Classification Search
 CPC . H04L 63/14; H04L 63/1416; H04L 12/1407; H04L 63/108
 USPC .............. 709/244, 217–220, 246–247, 249; 380/270; 455/410–411; 726/11, 1–4, 726/22–25; 713/153–154, 187–188, 713/193–194
 See application file for complete search history.

(56) References Cited

U.S. PATENT DOCUMENTS

| | | | |
|---|---|---|---|
| 6,772,347 B1 * | 8/2004 | Xie et al. | 726/11 |
| 7,342,906 B1 * | 3/2008 | Calhoun | 370/338 |
| 7,373,666 B2 * | 5/2008 | Kaler et al. | 726/23 |
| 7,624,447 B1 * | 11/2009 | Horowitz et al. | 726/23 |
| 7,729,324 B2 * | 6/2010 | Kachi | 370/338 |
| 2002/0075844 A1 * | 6/2002 | Hagen | 370/351 |
| 2004/0098610 A1 * | 5/2004 | Hrastar | 713/200 |
| 2004/0167984 A1 * | 8/2004 | Herrmann | 709/229 |
| 2005/0097356 A1 * | 5/2005 | Zilliacus et al. | 713/201 |
| 2005/0108518 A1 * | 5/2005 | Pandya | 713/151 |
| 2005/0128989 A1 * | 6/2005 | Bhagwat et al. | 370/338 |
| 2005/0191997 A1 * | 9/2005 | Spearman et al. | 455/418 |
| 2005/0209876 A1 * | 9/2005 | Kennis et al. | 705/1 |
| 2005/0213553 A1 * | 9/2005 | Wang | 370/349 |
| 2005/0260973 A1 * | 11/2005 | van de Groenendaal | 455/411 |
| 2006/0083192 A1 * | 4/2006 | Dinescu et al. | 370/328 |
| 2006/0193300 A1 * | 8/2006 | Rawat et al. | 370/338 |
| 2007/0025245 A1 * | 2/2007 | Porras et al. | 370/229 |
| 2007/0025265 A1 * | 2/2007 | Porras et al. | 370/252 |
| 2007/0104126 A1 * | 5/2007 | Calhoun et al. | 370/328 |
| 2007/0180152 A1 * | 8/2007 | Montanez | 709/250 |
| 2008/0019352 A1 * | 1/2008 | Bennett | 370/352 |
| 2008/0043686 A1 * | 2/2008 | Sperti et al. | 370/338 |
| 2012/0243456 A1 * | 9/2012 | PalChaudhuri et al. | 370/312 |

* cited by examiner

*Primary Examiner* — Josnel Jeudy

(57) ABSTRACT

In some embodiments, a network system includes an access point to wirelessly associate with a client that provides signals with traffic specification attributes to the access point. The system also includes circuitry detect if at least one of the signals violates a traffic rule through considering at least one of the traffic specification attributes and to instruct the access point to disassociate the client in response to a particular number of violations. Other embodiments are described.

23 Claims, 3 Drawing Sheets

BLACKLISTING BASED ON A TRAFFIC RULE VIOLATION

FIELD

Embodiments of the invention relate to the field of communication security, and in particular, to a system, apparatus, and method for disrupting communications between a client and an access point in response to a traffic rule violation and preventing subsequent communications with that client.

GENERAL BACKGROUND

Various communication networks have been created to allow access to various network resources. To improve efficiency and to support mobility, many wireless access enhancements have been added to local, personal, and wide area networks. Based on these enhancements, Wireless Local Area Networks (WLANs), Personal Area Networks (PANs) and Wide Area Networks (WANs) have been and continue to be utilized by more and more users. For many of these networks, clients associate and communicate wirelessly with access points (APs), which operate as gateways for the wired network. Herein, examples of clients include, but are not limited or restricted to computers, printers, barcode scanners, and phones.

Blacklisting is used in networks to temporarily or permanently prevent a particular client from having access to the network. In some systems, blacklisting is accomplished by blocking access to the network for any wireless client having a particular Media Access Control (MAC) address. Access can be blocked at least temporarily until it is determined that the client is not a threat to the network.

The purpose behind blacklisting is to halt threats imposed by unauthorized clients to the network. However, current techniques to identify clients to be blacklisted are not as effective as they might be in identifying wireless clients that are trying to misuse the network.

BRIEF DESCRIPTION OF THE DRAWINGS

The invention may best be understood by referring to the following description and accompanying drawings that are used to illustrate embodiments of the invention.

DETAILED DESCRIPTION

Figure 1:
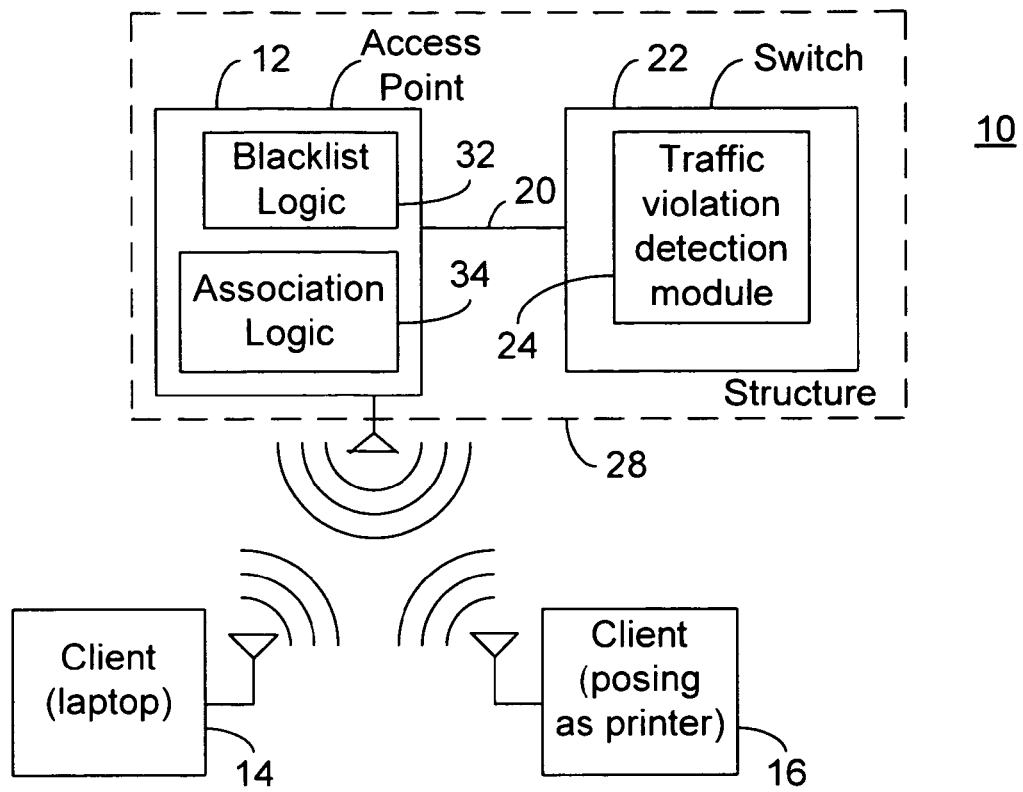
FIG. 1 is an exemplary block diagram representation of embodiments for a network including clients, an access point, and a switch.

Embodiments of the invention relate to the field of communication security, and in particular, to a system, apparatus, and method for disrupting communications between a client and an access point (AP) in response to a traffic rule violation. As an example, such disruption may be accomplished by disassociating the client from the AP, and in certain situations, disassociation and prevention of subsequent associations by the client to the AP occurs. In other embodiments, disruption may be accomplished by deauthenticating the client.

According to one embodiment of the invention, circuitry receives packets from the client through an access point and detects if the packets violate a traffic rule by considering at least one traffic specification attribute in a packet. Following a determination of a traffic violation, the client may be blacklisted from the access point. Moreover, it is contemplated that the AP may share blacklisted information with other APs, or such information may be stored at a centralized source, in order to prevent the client from associating with another AP for the network.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

Herein, a "wireless device" may be broadly construed as any device that supports wireless communications. For instance, one type of wireless device may operate as an access point while another type of wireless device may operate as a client. Clients associate and communicate wirelessly with access points (APs). Examples of clients include computers, personal digital assistants (PDAs), printers, barcode scanners, phones or the like.

A "wireless link" may be broadly construed as a pathway that supports wireless communications between two wireless devices. The wireless communications are in accordance with any wireless communication standard such as High Performance Radio LAN (HiperLan) or IEEE 802.11 for example. Examples of different types of IEEE 802.11 standards include, but are not limited or restricted to (i) an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), (ii) an IEEE 802.11a standard entitled "Wireless LAN Medium Access Control (MAC) and Physical Layer (PHY) specifications: High-Speed Physical Layer in the 5 GHz Band" (IEEE 802.11a, 1999), (iii) a revised IEEE 802.11 standard "Wireless LAN Medium Access Control (MAC) and Physical Layer (PHY) specifications" (IEEE 802.11, 2003), or the like.

The wireless communications between two wireless devices are generally controlled by logic, namely hardware and/or software. The hardware may include any data processing unit including a network processor, an Application Specific Integrated Circuit (ASIC), a Field Programmable Gate Array (FPGA), or the like. The software may be implemented in any of a number of forms such as an application, a module, an applet, a routine or even one or more executable instructions stored in a storage medium. The "storage medium" may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a digital tape, a Universal Serial Bus "USB" flash drive), or the like.

A "packet" is information arranged in a selected format that is transmitted over a link. A network signaling packet commonly includes OSI (Open Systems Interconnection) Layer 3 and Layer 4 information including a source IP (Internet Protocol) address, a destination IP address, a source port, a destination port, and a data transfer protocol. Examples of the protocol include Transmission Control Protocol (TCP) and User Diagram Protocol (UDP). Moreover, a service set identifier (SSID) is a code to identify packets in a wireless network.

As used herein, the term "embodiment" refers to an implementation. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. Different references to "some embodiments" do not necessarily refer to the same "some embodiments."

If the specification states a component, feature, structure, or characteristic "may", "might", or "could" be included, that particular component, feature, structure, or characteristic is not required to be included. If the specification or claim refers to "a" structure, that does not mean there is only one of the structure.

Referring to FIG. 1, an illustrative embodiment of a network 10 implemented with an embodiment of the invention is shown. Network 10 includes an access point (AP) 12 and a plurality of clients 14 and 16 that communicate over wireless links with AP 12, although network 10 may be implemented with a single wireless client (e.g., client 14). In addition, a networking switch 22 may be deployed and in communication with AP 12 over a wired link 20.

Herein, coupled to AP 12, switch 22 includes a traffic violation detection module 24. In the embodiment of FIG. 1, AP 12 and switch 22 are in communication over a wireless or wired link such as electrical wires, cable, and the like. These components are separately located. However, as an alternative embodiment, AP 12 and switch 22 may be deployed in a common structure 28 as identified by dashed lines.

AP 12 includes a blacklist logic 32 and association logic 34. Blacklist logic 32 is configured to control blacklisting operation by disrupting communications between a particular client and AP 12 and/or preventing reestablishment of such communications by AP 12. If it is desired to prevent communications with the client from being reestablished, blacklist logic 32 is adapted to store information pertaining to the blacklisted client such as the Medium Access Control (MAC) address for example. Moreover, blacklist logic 32 may be implemented with a timer or counter in the event that communications may be reestablished after a predetermined period of time. No timer or counter is needed if the blacklisting is permanent or temporary but requires an administrator to remove the restriction.

According to one embodiment of the invention, the blacklist operations occur in response to a determination by logic within switch 22 (e.g., traffic violation detection module 24) that a traffic violation has occurred. Of course, as an alternative embodiment, it is contemplated that the determination of traffic violations may occur within AP 12 itself or within another component deployed within network 10.

Association logic 34 comprises hardware and/or software adapted to establish and maintain communications between AP 12 and a particular client (e.g., client 14). For instance, association logic 34 may include software adapted to control a transmitter/receiver (e.g., transceiver) for establishing communication paths with one or more clients 14 and 16 in order transmit and receive data.

As an illustrative example, client 14 is a laptop computer and client 16 is another laptop computer posing as a printer. Association circuitry 34 associates with clients 14 and 16. At some point, client 16 tries to hack into the network and, for example, tries to scan the network and/or web browse. As will be explained, traffic violation detection module 24 in switch 22 detects a traffic violation from client 16 and in response thereto, switch 22 issues an instruction to AP 12 to add client 16 to a storage device within blacklist logic 32 and association circuitry 34 disrupts communications from AP 12 to client 16. When client 16 tries to re-associate with AP 12, AP 12 will check contents within the storage device of blacklist logic 32 before associating with it. When AP 12 determines that client 16 is on the blacklist, it will not allow association logic 34 to associate with client 16.

There are various ways in which an access point can identify client 16 as being blacklisted. One way is by its IP address and another way is by its MAC address. If for some reason, client 16 is able to present itself as a new client, traffic violation detection module 24 will discover it if it is involved with another traffic violation.

In some embodiments, once a client is blacklisted, it stays blacklisted. In other embodiments, a client may be blacklisted either for a predetermined amount of time or until the network removes the blacklisted status at the request of, for example, the system administrator.

In the following discussion, signals are referred to as packets, although in other embodiments, packets are not required. A network signal packet commonly includes OSI Layer 3 and Layer 4 information including a source IP address, a destination IP address, a source port, a destination port, and a data transfer protocol. Examples of the transfer protocol are TCP and UDP, although other protocols can be used.

Certain pieces of information in packets are referred to herein as traffic specification attributes. Traffic violation detection module 24 considers at least one of the traffic specification attributes in deciding whether the rule is violated. Considering the traffic specification attributes can involve comparing them with requirements of rules that test for a traffic violation. In some embodiments of the invention, there are five traffic specification attributes: a source IP address, a destination IP address, a source port, a destination port, and a protocol. In other embodiments of the invention, there are more or fewer traffic specification attributes. For example, in some embodiments of the invention, there are the following four traffic specification attributes: a source IP address, a destination IP address, a source port, and a destination port. In some embodiments, some rules compare less than all of the attributes with requirements of the rule. The requirements can involve elements discussed below.

Figure 2:
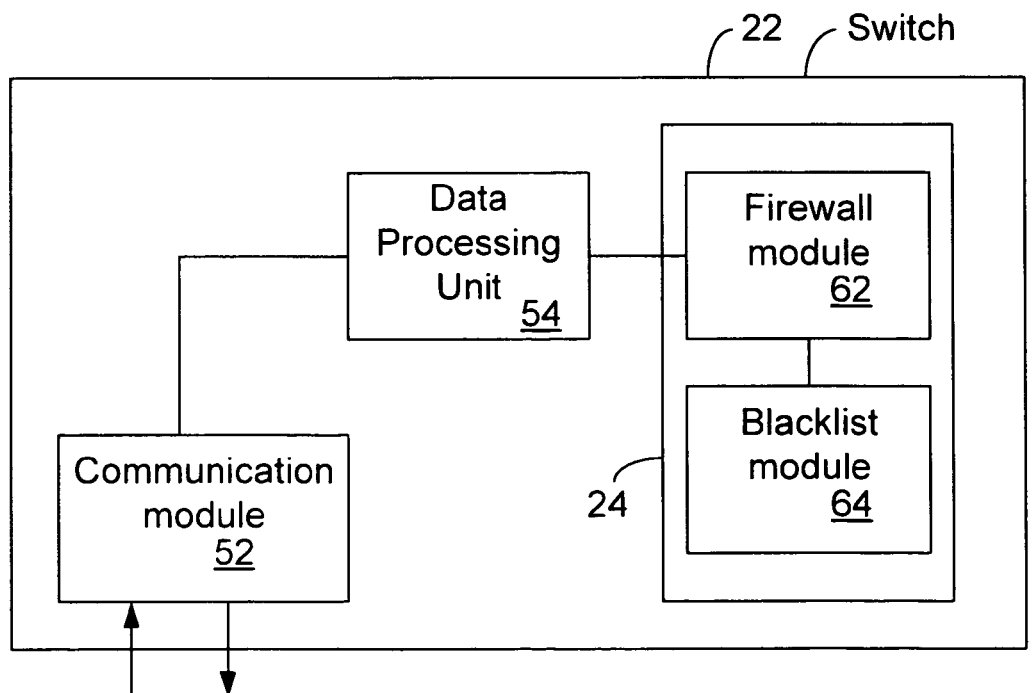
FIG. 2 is an exemplary block diagram representation of embodiments of the switch of FIG. 1.

FIG. 2 illustrates details of an embodiment of switch 22, although switch 22 is not limited to these details. Various other details may be used. Further, in an actual implementation, switch 22 would include a variety of other components not illustrated in FIG. 2.

Referring to FIG. 2, a communication module 52 communicates with components outside switch 22. Although separate unidirectional incoming and outgoing arrows are shown, communications could be bi-directional on conductors. A data processing unit 54 performs a variety of functions including interfacing with traffic violation detection module 24. According to one embodiment of the invention, traffic violation detection module 24 is configured as separate circuitry from data processing unit 54 and in another embodiment, traffic violation detection module 24 may be software and/or firmware running on data processing unit 54. In still another embodiment of the invention, traffic violation detection module 24 is a combination of separate circuitry and software and/or firmware running on data processing unit 54.

In the embodiment of FIG. 2, traffic violation detection module 24 includes a firewall module 62 and a blacklist module 64, although these details are not required in other embodiments. Firewall module 62 acts as a gateway to packets passing to different parts of the network. In this respect, firewall module 62 performs functions in addition to those related to detecting traffic violations and identifying clients as being blacklisted. Blacklist module 64, which may be integrated with firewall module 62, decides whether a client should be blacklisted and signals AP 12 to cease communications with the client. This may involve blacklist logic 32 of AP 12 transmitting a Disassociation or Deauthentication frame to the client. Blacklist module 64 decides to blacklist a client when it has violated a traffic rule for the client a particular number of times. As is explained, the particular number can be one or another number.

As part of blacklist processing, one or more of the traffic specification attributes of the incoming packets are compared with requirements of rules. Depending on the results of the comparisons, certain actions may be taken.

In some embodiments, there are two types of rules: (1) rules that test for a traffic violation and (2) rules that do not test for a traffic violation. In the case of rules that do not test for a traffic violation, one or more of the traffic specification attributes and perhaps other information is compared with rule requirements. If the requirements of a rule are not satisfied, then switch 22 does not perform the action associated with that rule, and the next rule is considered. In some embodiments, the rules are provided in sequence with an action taking place in response to the rule that is satisfied. In other embodiments, more complicated branching structures could be involved with the actions not occurring until multiple rules have been satisfied or the path of rules changes depending on whether or not certain rules are satisfied. In some embodiments, there may be a rule that if it is satisfied, there is not a traffic violation and if it is not satisfied, there is a traffic violation.

In the case of rules that test for traffic violations, one or more of the traffic specification attributes are compared with elements of the rule. The following are examples of rule elements that might be included in the same rule:

1. a list of all source IP addresses that are acceptable under certain circumstances;
2. a list of all source IP addresses that are not acceptable under certain circumstances;
3. a list of all destination IP addresses that are acceptable under certain circumstances;
4. a list of all destination IP addresses that are not acceptable under certain circumstances;

and so forth with lists of source and destination ports and protocols that are acceptable or not acceptable under certain circumstances. The circumstances could include the type of client and, in some cases, may be based on the values of one or more of the other attributes.

It is contemplated that, according to one embodiment of the invention, only one traffic rule needs to be violated for a blacklisting to occur, whereas in other embodiments, more than one rule may need to be violated for a blacklisting. The rules that can detect a traffic violation may appear at the beginning, middle, or end of the list of rules.

For some rules, the attributes that lead to a violation may depend on the type of client involved. For example, attributes of a client posing as a printer that will lead to a traffic violation may be different than those of a client that is a laptop and that is presented as a laptop.

As an example, packets from client 16 have source IP address 1.2.3.4 to a network 10.0.0.0 with HTTP and a TCP protocol. This is denied and creates a traffic violation because the IP address does not have a right to access the network in that way. In this illustrative example, the source IP address is 1.2.3.4; the source port is not specified and can be any port; the destination IP is 10.0.0.0; the destination port is 80, and the protocol is TCP protocol.

For some rules, all the attributes are considered in deciding whether there is a traffic violation. In other rules, if one or more of the attributes have particular values (or do not have particular values), then it does not matter what values are associated with the other attributes. For example, there may be a traffic violation if a particular client has a certain source port or destination port regardless of what protocol is used.

The client is blacklisted if its attributes lead to a traffic violation a particular number of times. The number of times may depend on the type of client and the traffic rules violated. For instance, it is contemplated that, for at least one type of client, any traffic violation leads to a permanent blacklisting. For another type of client, however, more than one traffic violation of some rules may be needed for blacklisting and/or the blacklisting is only temporary. However, in some embodiments, for at least one type of client, more than one traffic violation of some rules may be needed for blacklisting and/or the blacklisting is only temporary, but a violation of another rule leads to permanent blacklisting. In some embodiments, the particular number may be the sum of the same rule being violated more than once or be the sum of different rules being violated or a combination of them.

In some embodiments, the rules are being applied sequentially and in other embodiments, some rules may be applied in parallel. In some embodiments, one of the rules is that if the packet does not satisfy any of the other rules, then it is blacklisted.

Figure 3:
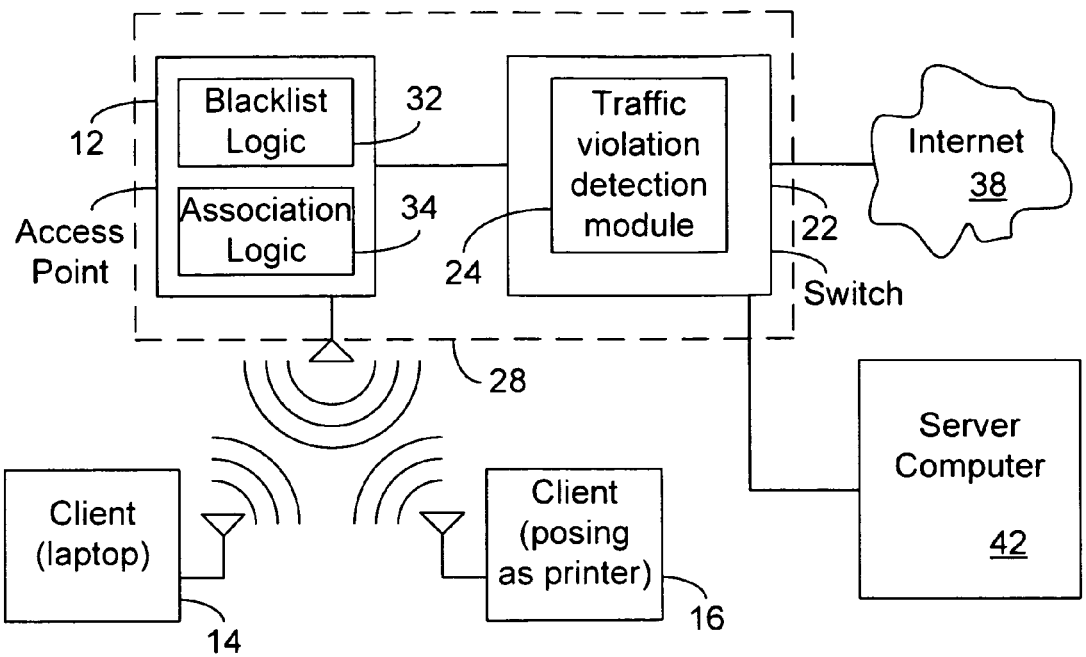
FIG. 3 is an exemplary block diagram representation of embodiments for a network similar to FIG. 1 but which includes the Internet and a server computer.

FIG. 3 illustrates a network system that is similar to that of FIG. 1 except that Internet 38 and a server computer 42 are illustrated. Server computer 38 may perform various functions those involving authentication, although authentication could be performed in other locations.

Figure 4:
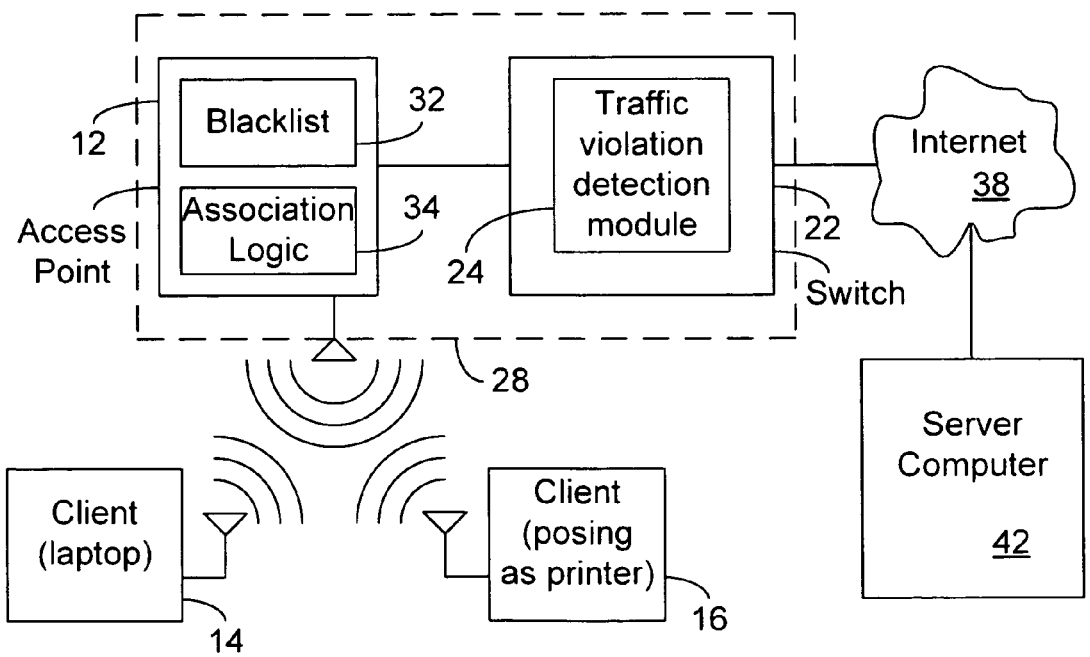
FIG. 4 is an exemplary block diagram representation of exemplary embodiments for a network system similar to FIG. 3 but which includes the server computer in communication with the switch over the Internet.

FIG. 4 illustrates a network system that is similar to that of FIG. 3 except that server computer 42 is in communication with switch 22 over Internet 38.

Figure 5:
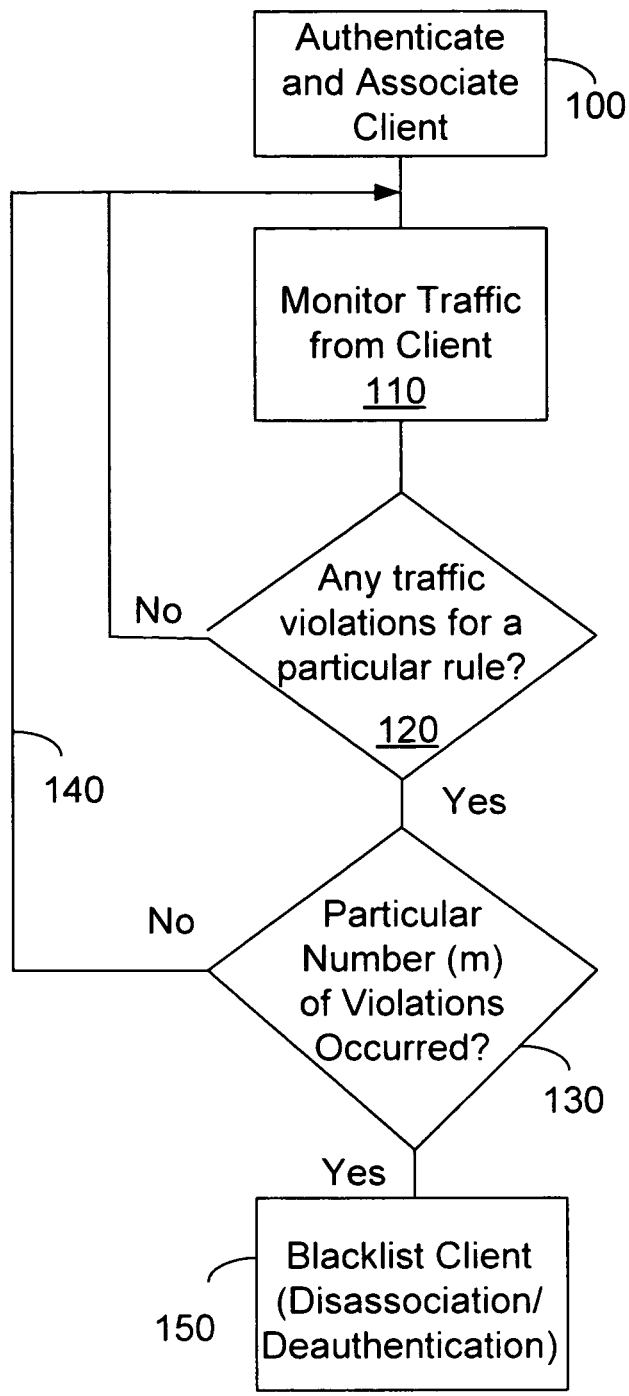
FIG. 5 is an exemplary flowchart of a representation of operations performed in accordance with embodiments of the invention.

FIG. 5 is an exemplary flowchart giving a simplified representation of some methods performed by some of the embodiments. However, the inventions are not limited to these examples and other details may be used. Referring to FIG. 5, the client is authenticated and associates with an access point (block 100). Thereafter, traffic from the client is monitored to determine if there have been any traffic violations for a particular rule (blocks 110 and 120). According to one embodiment of the invention, this determination may involve a comparison of traffic specification attributes of packets from the client with the particular rule. If the rule is satisfied (e.g., if the rule is not violated or the rule is violated but is used to detect a traffic violations), the traffic is analyzed for another rule until a complete listing of rules has been analyzed.

If the rule tests for a traffic violation and there is a violation, and the particular number "m" (m≥1) of violations has not occurred (block 130), then the attributes are compared with the requirements of the next rule (line 140). If a rule tests for a traffic violation and there is violation, and the particular number of violations has occurred (block 130), then the client is blacklisted and communications with the access point are discontinued (block 150). Blacklisting may involve disassociation and/or deauthentication of the client for a temporary period of time or permanently.

Some embodiments are somewhat different from that illustrated in the simplified flowchart of FIG. 5. In some embodiments, any violation leads to blacklisting so block 530 is not used.

In some embodiments, the rules used or the lists of the elements might be updatable through, for example, the Internet, or through a storage medium such as a CD ROM, Digital Versatile Disc (DVD), flash memory, or other memory.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A non-transitory computer readable medium comprising instructions which, when executed by one or more hardware processors of a network device operating in a network, cause the network device to:
    determine that one or more attributes characterizing a communication between a first client device that was previously authenticated to operate on the network and a second client device, violate one or more of a set of traffic rules that describe traffic attributes;
    responsive to determining that the one or more transmissions violate one or more of the set of traffic rules:
        transmit a disassociation frame or a de-authentication frame for the first client device; and
        add the first client device to a blacklist;
    receive by an access point from the first client device, one or more requests;
    determine that the first client device is included in the blacklist; and
    responsive at least to determining that the first client device is included in the blacklist:
        prevent the first client device from completing an association with the access point.

2. The medium of claim 1, comprising further instructions that when executed by the one or more hardware processors of the network device, cause the network device to:
    transmit the blacklist to a plurality of access points to prevent association of client devices in the blacklist with any of the plurality of access points.

3. The medium of claim 1, wherein the instructions that cause the network device to receive, determine that the first client device is included in the blacklist, and prevent are performed subsequent to causing a disassociation of the first client device from the access point.

4. The medium of claim 1, wherein preventing the first client device from completing the association with the access point comprises preventing the first client device from completing the association for a temporary period of time.

5. The medium of claim 1, wherein preventing the first client device from completing the association with the access point comprises permanently preventing the first client device from completing the association.

6. The medium of claim 1, wherein (a) the determining that one or more attributes characterizing the communication between the first client device that was previously authenticated to operate on the network and the second client device, violate one or more of the set of traffic rules that describe traffic attributes and (b) the transmitting the disassociation frame or the de-authentication frame for the first client device are performed prior to receiving the one or more requests.

7. The medium of claim 1, wherein the disassociation frame for the first client device causes the first client device to disassociate from the access point.

8. The medium of claim 1, wherein determining that the first client device is included in a blacklist comprises determining that a Media Access Control (MAC) address of the first client device is included in the blacklist.

9. The medium of claim 1, wherein the network device is the access point.

10. The medium of claim 1, wherein the network device is different from the access point.

11. A network device, comprising;
    a hardware processor that is configured to;
        determine that one or more attributes characterizing a communication between a first client device that was previously authenticated to operate on the network and a second client device, violate one or more of a set of traffic rules that describe traffic attributes;
        responsive to determining that the one or more transmissions violate one or more of the set of traffic rules:
            transmit a disassociation frame or a de-authentication frame for the first client device; and
            add the first client device to a blacklist;
        receive by an access point from the first client device, one or more requests;
        determine that the first client device is included in the blacklist; and
        responsive at least to determining that the first client device is included in the blacklist:
            prevent the first client device from completing an association with the access point.

12. The network device of claim 11 further configured to:
    transmit the blacklist to a plurality of access points to prevent association of client devices in the blacklist with any of the plurality of access points.

13. The network device of claim 11, wherein receiving, determining that the first client device is included in the blacklist, and preventing are performed subsequent to causing a disassociation of the first client device from the access point.

14. The network device of claim 11, wherein preventing the first client device from completing the association with the access point comprises preventing the first client device from completing the association for a temporary period of time.

15. The network device of claim 11, wherein preventing the first client device from completing the association with the access point comprises permanently preventing the first client device from completing the association.

16. The network device of claim 11, wherein (a) the determining that one or more attributes characterizing the communication between the first client device that was previously authenticated to operate on the network and the second client device, violate one or more of the set of traffic rules that describe traffic attributes and (b) the transmitting the disassociation frame or the de-authentication frame for the first client device are performed prior to receiving the one or more requests.

17. The network device of claim 11, wherein the disassociation frame for the first client device causes the first client device to disassociate from the access point.

18. The network device of claim 11, wherein determining that the first client device is included in a blacklist comprises determining that a Media Access Control (MAC) address of the first client device is included in the blacklist.

19. The network device of claim 11, wherein the network device is the access point.

20. The network device of claim 11, wherein the network device is different from the access point.

21. The medium of claim 1, wherein the set of traffic rules include a set of destination addresses that are unacceptable for transmissions by the first client device.

22. The medium of claim 1, wherein preventing the first client device from completing an association with the access point is performed in response to determining that two or more rules from the set of traffic rules have been violated.

23. The medium of claim 1, wherein the set of traffic rules are selected based on the type of the first client device.

* * * * *